June 3, 1958     A. W. TRONNIER     2,837,009

OBJECTIVE LENS WITH SHORT REAR LENGTH

Filed May 2, 1956

INVENTOR
Albrecht Wilhelm Tronnier
BY
ATTORNEYS

United States Patent Office 2,837,009
Patented June 3, 1958

2,837,009

OBJECTIVE LENS WITH SHORT REAR LENGTH

Albrecht Wilhelm Tronnier, New York, N. Y., assignor to Farrand Optical Co., Inc., New York, N. Y., a corporation of New York Application May 2, 1956, Serial No. 582,137

16 Claims. (Cl. 88—57)

This invention relates to a high speed six-element objective lens especially adapted for photographic purposes. The lens of the invention has a relative aperture of about $f/2$ and can be given a very high degree of correction over a useful field on the object side of from 42 to 48 degrees, corresponding to an image diameter amounting to some 75 to 85 percent of the equivalent focal length.

High speed objectives with highly corrected image performance and with high relative aperture and field angle are described in the copending application Serial No. 546,382 of the present applicant. The lenses described in that application also comprise six elements can be provided with very high resolution. They include a three-element front lens-group of Gaussian type followed by a diaphragm, behind which there is disposed a rear lens-group comprised of three air-spaced elements. Such an arrangement of lens elements can always be used to advantage when sufficient free space is available within the camera on the image side of the diaphragm. When however, as with folding or mirror reflex-type cameras, there is available only a limited free space on the image side, a lens type in accordance with the copending application cited is difficult to employ and may indeed be unusable in various constructional types of cameras.

With the progress of the photographic art, the demand for objective types which can be given a high degree of correction becomes continuously more severe. At the same time the mechanical and functional requirements of camera construction must be satisfied in order that such highly corrected objectives may be advantageously used. To this end, the present invention provides a new objective type which can be provided with a very high degree of correction and which also includes a very compact two-element rear lens-group, providing a large free space between the diaphragm and the image plane.

The invention will now be described in detail with reference to the accompanying drawings in which.

Figure 1:
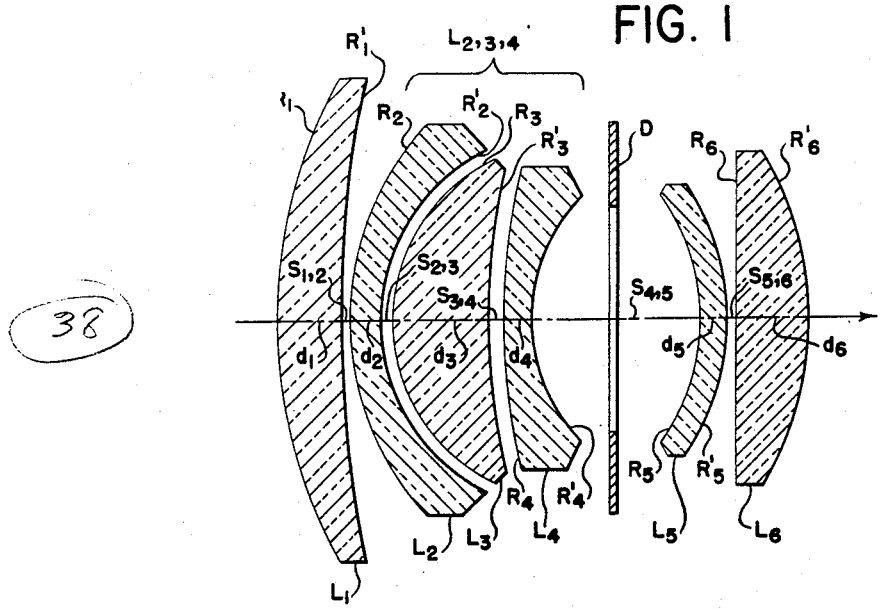
Fig. 1 is an axial section through a lens according to the invention.

The objective of the invention begins on the long conjugate side with a positive meniscus front element $L_1$ followed by a three-element component $L_2$, $L_3$, $L_4$. The component $L_2$, $L_3$, $L_4$ includes, from front to back, a strongly dispersive meniscus element $L_2$ concave toward the diaphragm, an intermediate positive element $L_3$ having unequal surface curvatures and a divergent element $L_4$ of unequal surface curvatures having its more strongly divergent surface directed toward the diaphragm. On the short conjugate side of the diaphragm the rear lens-group comprises a negative meniscus element $L_5$ concave toward the diaphragm and a strongly positive element $L_6$ of unequal surface curvatures. The negative meniscus elements $L_2$ and $L_5$, which are concave toward the diaphragm, have such high surface refractive power that the converging surfaces of both, identified in Fig. 1, by the radii $R_2$ and $R'_5$ both possess positive power, i. e., as to each of these surfaces, the ratio of the difference in index across the air-glass interface to its radius of curvature is positive. For both surfaces this quotient is between 1.4 and 3.2 times the equivalent refractive power of the entire objective. Moreover, for the elements $L_2$ and $L_5$, the absolute value of the sum of their surface power sums is between 1.15 and 2.30 times the equivalent refractive power of the entire objective. It is to be noted that reference is here made to the absolute value of the sum of the surface power sums, and not to the sum of the absolute value of the surface power sums or of the individual surface powers. The absolute value in question is therefore obtained by taking for each element the algebraic sum of its two surface powers, by taking the algebraic sum of two surface power sums so taken, and then by taking the absolute value of the algebraic sum last mentioned. The term "absolute value" is similarly to be understood wherever used herein, so that for example a reference to the absolute value of the surface power sum of an element means the absolute value of the algebraic sum of its individual surface powers.

Algebraically, these inequalities may be written as follows:

$$1.4\,\Phi < \phi_2 < 3.2\,\Phi$$
$$1.4\,\Phi < \phi'_5 < 3.2\,\Phi$$

and $$1.15\,\Phi < -(\phi_{II} + \phi_V) < 2.3\,\Phi$$

wherein $\Phi$ is the equivalent refractive power of the entire objective, $\phi_2$ and $\phi_5$ are the individual powers of the surfaces $R_2$ and $R'_5$ under consideration, while $\phi_{II}$ and $\phi_V$ are respectively the surface power sums (taken algebraically) of the elements $L_2$ and $L_5$. Thus, according to the same convention as to nomenclature, $$\phi_{II} = \phi_2 + \phi_2'$$
$$\phi_V = \phi_5 + \phi_5'$$

With the help of these characteristics, the objectives of the invention can be given the high degree of correction made possible according to the disclosure of the copending application Serial No. 546,382 and at the same time possess the short physical length of the rear lens group behind the diaphragm which makes possible their incorporation into compact photographic cameras.

In the course of the investigations which lead to the present invention the applicant has found that at the high speed available with the objectives of the invention, images of the highest resolution can be obtained even at maximum relative aperture by an appropriate distribution of the zonal aberrations of the aperture errors in the image formation of both the axial and off axis field. To this end according to the invention the power of the positive front element $L_1$ is so proportioned that the sum of its surface powers is between $0.40\,\Phi$ and $0.90\,\Phi$, wherein $\Phi$ as before is the equivalent refractive power of the complete objective.

The optical significance of this last-named characteristic of the invention may be understood by considering the fact that if the lower limit thereby established for the surface power sum of the front element is transgressed, the other positive elements of the objective must, for achievement of the necessary total power, be given such high powers that the reduction of the aperture errors will be unfavorably affected. Conversely, if the maximum limit is exceeded, excessive Eigen-aberrations will be given by the front element to the high aperture bundles for both axial and off-axis image formation.

In the lateral portions of the field the quality of the imagery produced by the high aperture bundles depends not only on the disposition of the zonal residual aperture aberrations but also on the errors of asymmetry. The invention permits a simple and highly satisfactory reduction of these asymmetry errors consistently with the constructional characteristics already cited by appropriate choice of power for the negative meniscus elements $L_2$ and $L_5$. These are so dimensioned that, in absolute value, the sum $\phi_{II}$ of the surface powers of $L_2$ lies between 0.65 and 1.30 $\Phi$ whereas the absolute value of the sum $\phi_V$ of the surface powers of $L_5$ lies between 0.50 and 1.0 $\Phi$.

The new objective of the invention includes elements ordered as follows:

> Positive meniscus
> Negative meniscus
> Positive element
> Negative element
> Diaphragm
> Negative meniscus
> Positive element This order, in which positive and negative powers alternate, permits, for the transfer from the long to the short conjugate side, not only an extraordinarily fine correction of sphero-chromatism in the intersection distances on the image side but also an unusually complete fulfillment of the sine-coincidence-condition for several colors within the range of wave lengths of photographic significance.

Moreover this alternating succession of lens powers, which is characteristic of the objectives of the invention, contributes in an astonishing way to the achievement of an unusually complete anastigmatic flattening of the field. This field flattening can be further improved according to another feature of the invention pursuant to which the rear lens-group is given such power that the sum (i. e. algebraic sum) of the surface power sums of its two elements $L_5$ and $L_6$ lies between 0.65 and 1.30 times the equivalent refractive power $\Phi$ of the complete system.

With respect to the power relationships of the invention as between the negative meniscus elements $L_2$ and $L_5$, it may be observed that the achievement last mentioned, of an improved lateral image quality may be attained in the optimum degree if the last positive element $L_6$ on the image side is given a surface power sum of approximately the same order of magnitude as the absolute value of the combined sums of the surface powers of the two negative meniscus elements $L_2$ and $L_5$. Thus the objective of the invention is characterized by the following distribution of surface powers among its various elements:

$$0.40\,\Phi < \phi_I < 0.90\,\Phi$$
$$0.65\,\Phi < -\phi_{II} < 1.30\,\Phi$$
$$0.50\,\Phi < -\phi_V < 1.00\,\Phi$$
$$1.15\,\Phi < \phi_{VI} < 2.30\,\Phi$$

In these inequalities $\Phi$ is the equivalent power of the complete objectives whereas $\phi_I$, $\phi_{II}$, $\phi_V$ and $\phi_{VI}$ present the individual algebraic sums of the surface powers of elements $L_1$, $L_2$, $L_5$ and $L_6$ respectively.

Insofar as the lenses of the invention are constructed of the usually commercially available glasses without resort to glasses or crystals of extreme indices, the elements $L_3$ and $L_4$ between the negative meniscus $L_2$ and the diaphragm are advantageously proportioned as follows:

For $L_3$, a surface power sum $\phi_{III}$ between 1.3 and 2.6 $\Phi$.
For $L_4$, a surface power sum $\phi_{IV}$ of absolute value between 1.6 and 3.2 $\Phi$.

For a preferred embodiment of the objective of the invention the following inequalities thus apply:

$$0.40\,\Phi < \phi_I < 0.90\,\Phi$$
$$0.65\,\Phi < -\phi_{II} < 1.30\,\Phi$$
$$1.30\,\Phi < \phi_{III} < 2.60\,\Phi$$
$$1.60\,\Phi < -\phi_{IV} < 3.20\,\Phi$$

Diaphragm
$$0.50\,\Phi < -\phi_V < 1.00\,\Phi$$
$$1.15\,\Phi < \phi_{VI} < 2.30\,\Phi$$

in which the subscripts on $\phi$ refer to the components $L_1$ to $L_6$, respectively. In these inequalities the power $\phi$ of a surface of radius R is computed according to the usual formula:

$$\phi = (n'-n)/R$$

Thus for the element $L_2$ the surface power sum $\phi_{II}$ is given by the definition:

$$\phi_2 + \phi'_2 = \phi_{II}$$

The three-element component $L_2$, $L_3$, $L_4$ between the positive front element $L_1$ and the diaphragm D can as in the triplets of the prior art have its three elements cemented together. It may also be partly cemented or wholly uncemented. The fully cemented case with two cemented surfaces would be of primary advantage if the objective were to be made without anti-reflecting coatings. This involves however difficulties in centering and the disadvantage that the necessity for equal radii at cemented surfaces sacrificed the correction possibilities inherent in a difference of radii. If all three elements of the triplet are air spaced from each other, the maximum correction possibilities are available and the elements are easiest to center although the cost of manufacture and assembly will be higher. The use of one cemented surface constitutes a fair compromise which will accordingly be used in the following examples of the invention.

There will now be given five examples of the objective of the invention. In these examples the radii R (with subscripts for the successive elements) are the radii of the surfaces directed toward the long conjugate side whereas the radii R' (with similar subscripts) represent the radii of the surfaces directed toward the short conjugate side. The subscripts begin at the long conjugate side of the system. Lens thicknesses along the axis are denoted $d$ with subscripts whereas the spacing of the vertices are denoted $s$ (with subscripts denoting the adjacent elements). The glasses, which are of commercially available types, are identified with their index numbers $h$ and Abbe numbers $v$, the indices being with respect to the yellow line $d$ of the helium spectrum, of 5876 Angstroms.

All five examples are of the partly cemented form, in particular that in which elements $L_2$ and $L_3$ are cemented together whereas an air space is provided between elements $L_3$ and $L_4$. The examples have been made up with various glass types in order to show that the objective of the invention makes available to the designer a wide range of choices among glasses. This is a fact of much practical importance, as is indicated by the fact that five different examples with such a wide range of glasses can be made all with the cemented arrangement of elements $L_2$ and $L_3$.

All examples relate to high speed anastigmats of relative apertures approximately $f/2$, the exact value being given in each case.

Each of these examples is truly corrected for spherical aberration, i. e. the curve of variation in the intersection distances on the image side passes exactly through zero for a finite height of incidence of a parallel ray. Likewise each of the examples has a true anastigmatic correction so that for at least one finite angle of inclination of the principal ray, within the useful field, the astigmatism is exactly zero.

Figure 2:
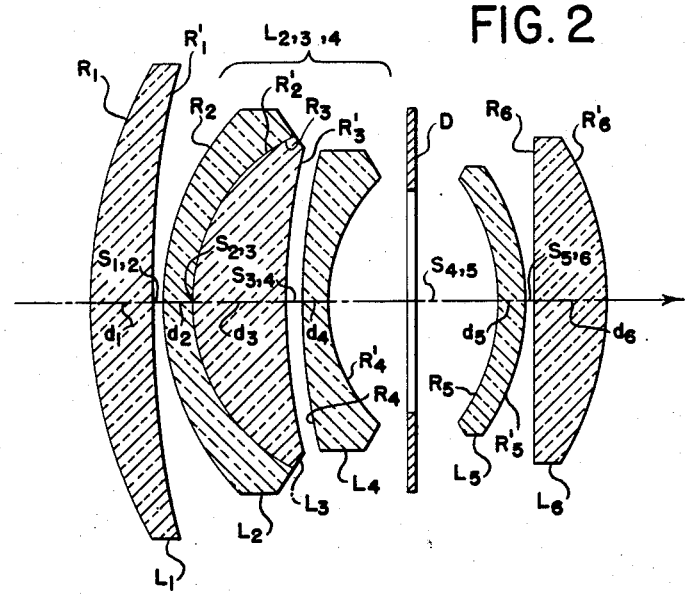
Fig. 2 is an axial section through another lens according to the invention.

The general form of the lens of each of the examples is illustrated in Fig. 2.

For each example lens data will be given in both coarse and fine terms, either in the form of power relations among the various surfaces and elements, or in terms of lens dimensions and glass properties, or both, fine data in terms of lens dimensions and glass properties being in any event given for each example.

Example 1.—Approximate power relations

[Relative aperture $f/2.2$. Back focal length $=0.635\ \Phi^{-1}=63.5\%$ of the equivalent focal length $f$.]

| | | |
|---|---|---|
| $\phi_1=+1.1\ \Phi$ | $\phi_I=+0.65\ \Phi$ | $d_1=0.07\ \Phi^{-1}$ |
| $\phi_1'=-0.45\ \Phi$ | | $s_{1,2}\approx 0.01\ \Phi^{-1}$ |
| $\phi_2=+2.0\ \Phi$ | $\phi_{II}=-1.0\ \Phi$ | $d_2=0.03\Phi^{-1}$ |
| $\phi_2'=-3.0\ \Phi$ | | $s_{2,3}\approx 0\ \Phi^{-1}$ |
| $\phi_3=+2.9\ \Phi$ | $\phi_{III}=+2.1\ \Phi$ | $d_3=0.12\ \Phi^{-1}$ |
| $\phi_3'=-0.8\ \Phi$ | | $s_{3,4}\approx 0.02\ \Phi^{-1}$ |
| $\phi_4=+0.7\ \Phi$ | $\phi_{IV}=-2.5\ \Phi$ | $d_4=0.03\ \Phi^{-1}$ |
| $\phi_4'=-3.2\ \Phi$ | Diaphragm space | $s_{4,5}\approx 0.23\ \Phi^{-1}$ |
| $\phi_5=-3.0\ \Phi$ | $\phi_V=-.08\ \Phi$ | $d_5=0.04\ \Phi^{-1}$ |
| $\phi_5'=+2.2\ \Phi$ | | $s_{5,6}\approx 0.01\ \Phi^{-1}$ |
| $\phi_6=0$ | $\phi_{VI}=+1.7\ \Phi$ | $d_6=0.09\ \Phi^{-1}$ |
| $\phi_6'=+1.7\ \Phi$ | | |

For the achievement of a particularly well balanced image field correction of the third order the distribution of powers set forth in the preceding table can be further refined as follows:

Example 1.—Exact power relations

| | | |
|---|---|---|
| $\phi_1=+1.13\ \Phi$ | $\phi_I=+0.66\ \Phi$ | $d_1=0.065\ \Phi^{-1}$ |
| $\phi_1'=-0.47\ \Phi$ | $\phi s_{1,2}=+1.57\ \Phi$ | $s_{1,2}=0.005\ \Phi^{-1}$ |
| $\phi_2=+2.04\ \Phi$ | $\phi_{II}=-1.04\ \Phi$ | $d_2=0.030\ \Phi^{-1}$ |
| $\phi_2'=-3.08\ \Phi$ | | $s_{2,3}=0$ |
| $\phi_3=+2.93\ \Phi$ | $\phi_{III}=+2.12\ \Phi$ | $d_3=0.119\ \Phi^{-1}$ |
| $\phi_3'=-0.81\ \Phi$ | | $s_{3,4}=0.022\ \Phi^{-1}$ |
| $\phi_4=+0.69\ \Phi$ | $\phi_{IV}=-2.51\ \Phi$ | $d_4=0.025\ \Phi^{-1}$ |
| $\phi_4'=-3.20\ \Phi$ | Diaphragm space | $s_{4,5}=0.228\ \Phi^{-1}$ |
| $\phi_5=-3.03\ \Phi$ | $\phi_V=-0.77\ \Phi$ | $d_5=0.040\ \Phi^{-1}$ |
| $\phi_5'=+2.25\ \Phi$ | $\phi s_{5,6}=+2.25\ \Phi$ | $s_{5,6}=0.001\ \Phi^{-1}$ |
| $\phi_6=0$ | $\phi_{VI}=+1.73\ \Phi$ | $d_6=0.093\ \Phi^{-1}$ |
| $\phi_6'=+1.73\ \Phi$ | | |

From this general arrangement of the dioptric properties and by selecting for the elements $L_1$ to $L_6$ commercially available in glasses having index value $n$ of the following approximate values:

$n_1=1.7$     $n_4=1.7$
$n_2=1.73$    $n_5=1.73$
$n_3=1.69$    $n_6=1.69$ one arrives at the following approximate design for the objective of Example 1.

Example 1.—Approximate lens data for a focal length $f$

| Element | Radii | Thickness $d$ or Spacing $s$ | Index $n$ |
|---|---|---|---|
| $L_1$ | $R_1=+0.62f$ | $d_1=0.065f$ | 1.70 |
| | $R_1'=+1.5f$ | $s_{1,2}=0.005f$ | |
| $L_2$ | $R_2=+0.36f$ | $d_2=0.03f$ | 1.73 |
| | $R_2'=+0.24f$ | $s_{2,3}=0$ | |
| $L_3$ | $R_3=+0.24f$ | $d_3=0.12f$ | 1.69 |
| | $R_3'=+0.86f$ | $s_{3,4}=0.02f$ | |
| $L_4$ | $R_4=+1.0f$ | $d_4=0.025f$ | 1.70 |
| | $R_4'=+0.22f$ | $s_{4,5}=0.228f$ | |
| $L_5$ | $R_5=-.024f$ | $d_5=0.04f$ | 1.73 |
| | $R_5'=-0.32f$ | $s_{5,6}=0.001f$ | |
| $L_6$ | $R_6=\infty$ | $d_6=0.09f$ | 1.69 |
| | $R_6'=-0.4f$ | | |

In the foregoing table the equivalent focal length $f$ is taken as the unit of length, i. e. $f=\Phi^{-1}=1.0$.

With the extract index values of the glasses assumed in the foregoing rough computation, the fine correction achievable even by production methods with the lens of the example under consideration leads to the following lens data for a design based upon a focal length $f$ of 100 mm.:

Example 1.—Exact lens data

| Element | Radii in mm. | Thickness $d$ or Spacing $s$ in mm. | Index $n$ |
|---|---|---|---|
| $L_1$ | $R_1=+62.00$ | $d_1=6.456$ | 1.70322 |
| | $R_1'=+149.0$ | $s_{1,2}=0.497$ | |
| $L_2$ | $R_2=+35.76$ | $d_2=2.980$ | 1.72800 |
| | $R_2'=+23.64$ | $s_{2,3}=0$ | |
| $L_3$ | $R_3=+23.64$ | $d_3=11.92$ | 1.69347 |
| | $R_3'=+85,82$ | $s_{3,4}=2.159$ | |
| $L_4$ | $R_4=+101.0$ | $d_4=2.483$ | 1.69915 |
| | $R_4'=+21.85$ | $s_{4,5}=22.844$ | |
| $L_5$ | $R_5=-24.04$ | $d_5=3.973$ | 1.72755 |
| | $R_5'=-32.27$ | $s_{5,6}=0.149$ | |
| $L_6$ | $R_6=\infty$ | $d_6=9.336$ | 1.69347 |
| | $R_6'=-39.88$ | | |

This lens has a back focal length of 63.532 mm. and a relative aperture of $f/2.2$. The index values are with respect to the yellow $d$ line of the helium spectrum.

In view of its 100 mm. focal length the equivalent refractive power $\Phi$ of the finely corrected lens whose data are set out in the last table amounts to 10 diopters. The powers of its individual surfaces together with the surface power sums of its elements possess the following values:

| | |
|---|---|
| $\phi_1=+11.342$ dptr | $\phi_I=+6.622$ dptr |
| $\phi_1'=-4.720$ dptr | $\phi s_{1,2}=+15.638$ dptr |
| $\phi_2=+20.358$ dptr | $\phi_{II}=-10.437$ dptr |
| $\phi_2'=-30.795$ dptr | |
| $\phi_3=+29.335$ dptr | $\phi_{III}=+21.254$ dptr |
| $\phi_3'=-8.081$ dptr | |
| $\phi_4=+6.922$ dptr | $\phi_{IV}=-25.076$ dptr |
| $\phi_4'=-31.998$ dptr | diaphragm space |
| $\phi_5=-30.264$ dptr | $\phi_V=-7.718$ dptr |
| $\phi_5'=+22.546$ dptr | $\phi s_{5,6}=+22.546$ dptr |
| $\phi_6=0$ dptr | $\phi_{VI}=+17.389$ dptr |
| $\phi_6'=+17.389$ dptr | |

The surface power of the surface $R_2$ is seen to be 20.358 diopters or $2.0358\ \Phi$ and the surface power of the surface $R_5'$ is 22.546 diopters or $2.2546\ \Phi$. Consequently in accordance with the characteristic features of the invention previously set forth the surface power values for the front surface $R_2$ of the front negative meniscus and of the rear surface $R'_5$ of the rear negative meniscus both lie between 1.4 and 3.2 times the equivalent power $\Phi$ of the complete lens.

Moreover $$\phi_{II} = -10.437 \text{ dptr}$$

and $$\phi_V = -7.717 \text{ dptr}$$

The sum of these two powers is $-18.155$ diopters or, in absolute values, 1.8155 times the equivalent power $\Phi$ of 10 diopters. This is in accordance with the property of the lenses of the invention set forth in the inequality $$1.15 \Phi < -(\phi_{II} + \phi_V) < 2.3 \Phi$$

The surface power sum $\Phi_I$ of the front element $L_1$ is $+6.622$ diopters or $0.6622 \Phi$ in accordance with the lens property hereinbefore given:

$$0.4 \Phi < \phi_I < 0.90 \Phi$$

This example shows excellent image-forming properties for both axial and extra-axial points. For a principal ray inclined on the object side at 18.9 degrees, the astigmatism is exactly zero. This principal ray inclination corresponds to an image diameter of 68.1 percent of the equivalent focal length.

In view of the known relation of the power of a surface to its radius of curvature and to the index of refraction of the element in question, the unit of linear length has in Example 2 now to be considered, been selected as the front radius $R_1$ of the first element in the system. Moreover, in contrast with Example 1, the variation of index among the glasses of the three-element component $L_2$, $L_3$, $L_4$ has been substantially increased. This strikingly demonstrates the freedom in the choice of glasses which the present objective places at the disposal of the lens designer.

Example 2.—Approximate lens data

[Relative aperture $f/2.1$. Effective focal length $1.414 R_1$.]

| Element | Radii as multiples of $R_1$ | Thickness $d$ or Spacing $s$ as multiples of $R_1$ | Index $n$ |
|---|---|---|---|
| $L_1$ | $R_1 = +1.0 R_1$ | $d_1 = 0.093 R_1$ | 1.703 |
|  | $R_1' = +3.0 R_1$ | $s_{1,2} = 0.007 R_1$ |  |
| $L_2$ | $R_2 = +0.51 R_1$ | $d_2 = 0.057 R_1$ | 1.728 |
|  | $R_2' = +0.36 R_1$ | $s_{2,3} = 0.0 R_1$ |  |
| $L_3$ | $R_3 = +0.36 R_1$ | $d_3 = 0.171 R_1$ | 1.659 |
|  | $R_3' = +1.23 R_1$ | $s_{3,4} = 0.031 R_1$ |  |
| $L_4$ | $R_4 = +1.45 R_1$ | $d_4 = 0.036 R_1$ | 1.673 |
|  | $R_4' = +0.32 R_1$ | $s_{4,5} = 0.328 R_1$ |  |
| $L_5$ | $R_5 = -0.36 R_1$ | $d_5 = 0.057 R_1$ | 1.728 |
|  | $R_5' = -0.47 R_1$ | $s_{5,6} = 0.002 R_1$ |  |
| $L_6$ | $R_6 = +21.4 R_1$ | $d_6 = 0.174 R_1$ | 1.693 |
|  | $R_6' = -0.62 R_1$ |  |  |

The relation of the lens shapes among the elements of the example is clearly indicated in the preceding table of data in which the radius of curvature of the front surface of $L_1$ is selected as unity and serves as a unit of measure for the other radii as well.

Even the basic formulation of the lens of Example 2 set out in the preceding table shows a very satisfying degree of correction in the third order region. As is known, with such correction of the third order region, appropriate variations in the constructional lens data permit the achievement of a supplementary fine correction. In the case of the example under consideration these variations are indeed very slight, as appears from the following table which represent definitive data for the lens of the example under consideration.

Example 2.—Exact lens data

[Equivalent focal length $f = 1.41477$ units.]

| Element | Radii as multiples of $R_1$ | Thickness $d$ or spacing $s$ as multiples of $R_1$ | Index $n$ |
|---|---|---|---|
| $L_1$ | $R_1 = +1.0000 R_1$ | $d_1 = 0.09274 R_1$ | 1.70322 |
|  | $R_1' = +2.9962 R_1$ | $s_{1,2} = 0.00713 R_1$ |  |
| $L_2$ | $R_2 = +0.5136 R_1$ | $d_2 = 0.05707 R_1$ | 1.72800 |
|  | $R_2' = +0.3567 R_1$ | $s_{2,3} = 0 R_1$ |  |
| $L_3$ | $R_3 = +0.3567 R_1$ | $d_3 = 0.17121 R_1$ | 1.65953 |
|  | $R_3' = +1.2327 R_1$ | $s_{3,4} = 0.03102 R_1$ |  |
| $L_4$ | $R_4 = +1.4502 R_1$ | $d_4 = 0.03567 R_1$ | 1.67326 |
|  | $R_4' = +0.3253 R_1$ | $s_{4,5} = 0.32815 R_1$ |  |
| $L_5$ | $R_5 = -0.3567 R_1$ | $d_5 = 0.05707 R_1$ | 1.72755 |
|  | $R_5' = -0.4658 R_1$ | $s_{5,6} = 0.00214 R_1$ |  |
| $L_6$ | $R_6 = +21.401 R_1$ | $d_6 = 0.17406 R_1$ | 1.69347 |
|  | $R_6' = -0.6204 R_1$ |  |  |

The surface refractive powers corresponding to the data of the preceding table, expressed as fractions of the equivalent power $\Phi$ of the entire system as unit of power, reckon out as follows to a set of values consistent with the properties of the lens of the invention already stated:

Example 2.—Power relations

| | |
|---|---|
| $\phi_1 = +0.9949 \Phi$ | $\phi_I = +0.6628 \Phi$ |
| $\phi_1' = -0.3321 \Phi$ |  |
| $\phi_2 = +2.0053 \Phi$ | $\phi_{II} = -0.8823 \Phi$ |
| $\phi_2' = -2.8876 \Phi$ |  |
| $\phi_3 = +2.6160 \Phi$ |  |
| $\phi_3' = -0.7569 \Phi$ | $\phi_{III} = +1.8591 \Phi$ |
| $\phi_4 = +0.6568 \Phi$ |  |
| $\phi_4' = -2.9281 \Phi$ | $\phi_{IV} = -2.2713 \Phi$ |
| $\phi_5 = -2.8858 \Phi$ | Diaphragm space |
| $\phi_5' = +2.2096 \Phi$ | $\phi_V = -0.6762 \Phi$ |
| $\phi_6 = +0.0458 \Phi$ |  |
| $\phi_6' = +1.5814 \Phi$ | $\phi_{VI} = +1.6272 \Phi$ |

There will now be considered a third example of the lens of the invention in which the relative aperture is increased to $f/2.0$. This example shows that even with this high speed it is not necessary to provide a relatively large difference in index values between the front components $L_1$ and $L_2$, such as exists in Examples 1 and 2. On the contrary, Example 3 shows that the difference in index values between elements $L_1$ and $L_2$ may approach zero. This is a further indication of the wide freedom of choice which the lenses of the present invention offer to the lens designer. In round numbers, with linear dimensions expressed as multiples of the equivalent focal length $f$, the data of the lens of Example 3 are as follows:

*Example 3.—Approximate lens data for a focal length $f$*

| Element | Radii as multiples of $f$ | Thickness $d$ or Spacing $s$ as Multiples of $f$ | Index $n$ |
|---|---|---|---|
| $L_1$ | $R_1 = +0.67f$ | $d_1 = 0.085f$ | 1.724 |
|  | $R_1' = +1.81f$ | $s_{1,2} = 0.005f$ |  |
| $L_2$ | $R_2 = +0.36f$ | $d_2 = 0.033f$ | 1.728 |
|  | $R_2' = +0.25f$ | $s_{2,3} = 0.0f$ |  |
| $L_3$ | $R_3 = +0.25f$ | $d_3 = 0.121f$ | 1.660 |
|  | $R_3' = +0.87f$ | $s_{3,4} = 0.022f$ |  |
| $L_4$ | $R_4 = +1.02f$ | $d_4 = 0.025f$ | 1.673 |
|  | $R_4' = +0.23f$ | $s_{4,5} = 0.231f$ |  |
| $L_5$ | $R_5 = -0.25f$ | $d_5 = 0.040f$ | 1.728 |
|  | $R_5' = -0.33f$ | $s_{5,6} = 0.016f$ |  |
| $L_6$ | $R_6 = +25.2f$ | $d_6 = 0.092f$ | 1.713 |
|  | $R_6' = -0.44f$ |  |  |

Again the lens even as roughly specified in the foregoing table exhibits a very high degree of correction in the third order Seidel region. The lens of this example when worked out for fine correction with the commercially available glasses specified in the following table, and for a 100 mm. equivalent focal length $f$, possesses the following data:

| Element | Radii in mm. | Thickness $d$ or Spacing $s$ in mm. | Index $n$ | Abbe number $\nu$ |
|---|---|---|---|---|
| $L_1$ | $R_1 = +67.4074$ | $d_1 = 8.5312$ | 1.72381 | 38.0 |
|  | $R_1' = +181.086$ | $s_{1,2} = 0.5030$ |  |  |
| $L_2$ | $R_2 = +36.2173$ | $d_2 = 3.3199$ | 1.72800 | 28.4 |
|  | $R_2' = +25.1509$ | $s_{2,3} = 0$ |  |  |
| $L_3$ | $R_3 = +25.1509$ | $d_3 = 12.0724$ | 1.65953 | 57.0 |
|  | $R_3' = +86.9215$ | $s_{3,4} = 2.1871$ |  |  |
| $L_4$ | $R_4 = +102.260$ | $d_4 = 2.5151$ | 1.67326 | 32.2 |
|  | $R_4' = +22.9376$ | $s_{4,5} = 23.1388$ |  |  |
| $L_5$ | $R_5 = -25.1509$ | $d_5 = 4.0241$ | 1.72755 | 28.4 |
|  | $R_5' = -33.2998$ | $s_{5,6} = 1.6097$ |  |  |
| $L_6$ | $R_6 = +2515.09$ | $d_6 = 9.1549$ | 1.71300 | 53.9 |
|  | $R_6' = -43.7374$ |  |  |  |

The surface powers within the system of the foregoing table are distributed as follows:

*Example 3.—Power relations*

| | |
|---|---|
| $\phi_1 = +10.737842$ dptr | $\phi_I = + 6.740791$ dptr |
| $\phi_1' = -3.997051$ dptr |  |
| $\phi_2 = +20.100891$ dptr | $\phi_{II} = -8.844395$ dptr |
| $\phi_2' = -28.945286$ dptr |  |
| $\phi_3 = +26.222918$ dptr | $\phi_{III} = +18.635267$ dptr |
| $\phi_3' = -7.587651$ dptr |  |
| $\phi_4 = +6.583806$ dptr | $\phi_{IV} = -22.768001$ dptr |
| $\phi_4' = -29.351807$ dptr | Diaphragm space |
| $\phi_5 = -28.927394$ dptr | $\phi_V = -7.078914$ dptr |
| $\phi_5' = 21.848480$ dptr |  |
| $\phi_6 = +0.283489$ dptr | $\phi_{VI} = +16.585327$ dptr |
| $\phi_6' = +16.301838$ dptr |  |

The equivalent power of this objective is 10 diopters in view of its 100 mm. focal length.

On comparison of the rough with the fine data for the lens of Example 3, it will be seen how slight are the variations which lead from the approximate lens form, corrected within the third order region, to the completely worked out design having the finest degree of correction. The example moreover is susceptible of further simplifications, for example by the repeated use of a single radius of curvature, without sacrifice of the essential advantages of the invention.

Example 4, now to be considered, is an even faster lens than those of the preceding examples, possessing a relative aperture of $f/1.9$ with an unusually high degree of fine correction in image performance over an object field of more than 45 degrees. In order to demonstrate the flexibility of the invention, the glass for the front element $L_1$ in this example, in contrast to the preceding three examples, is selected to have an index of refraction below 1.7. In the lens data for Example 4, the unit of linear measure U is the radius of curvature $R_1$ of the front surface of $L_1$, linear lengths being expressed as percentages of U. In round terms the data of the lens of Example 4 may then be given as follows:

*Example 4.—Approximate lens data*

[Relative aperture $f/1.9$. Equivalent focal length $f = 150\%$ U]

| Element | Radii | Thickness $d$ or Spacing $s$ | Index $n$ |
|---|---|---|---|
| $L_1$ | $R_1 = +100\%$ U | $d_1 = 13\%$ U | 1.67 |
|  | $R_1' = +300\%$ U | $s_{1,2} = 1\%$ U |  |
| $L_2$ | $R_2 = +55\%$ U | $d_2 = 5\%$ U | 1.76 |
|  | $R_2' = +38\%$ U | $s_{2,3} = 0$ |  |
| $L_3$ | $R_3 = +38\%$ U | $d_3 = 18\%$ U | 1.69 |
|  | $R_3' = +131\%$ U | $s_{3,4} = 3\%$ U |  |
| $L_4$ | $R_4 = +155\%$ U | $d_4 = 4\%$ U | 1.70 |
|  | $R_4' = +35\%$ U Diaphragm space | $s_{4,5} = 35\%$ U |  |
| $L_5$ | $R_5 = -38\%$ U | $d_5 = 6\%$ U | 1.73 |
|  | $R_5' = -50\%$ U | $s_{5,6} = 2\%$ U |  |
| $L_6$ | $R_6 = +260\%$ U | $d_6 = 14\%$ U | 1.71 |
|  | $R_6' = -67\%$ U |  |  |

For the completely worked out and finely corrected form of this example now to be given there are employed the exact index values of commercially available glasses. It will be observed that the characteristic negative meniscus elements $L_2$ and $L_5$ are made from glasses of distinctly different types. In terms of a unit of linear measure equal to the radius of curvature of the front surface $R_1$ of $L_1$, the lens of Example 4 is characterized in finely corrected form by the following data:

Example 4.—Exact lens data

[Equivalent focal length $f = 1.508448\ R_1$.  Back focal length B. F. L. $= 0.883750\ R_1$]

| Element | Radii as multiples of $R_1$ | Thickness $d$ or Spacing $s$ as multiples of $R_1$ | Index $n$ | Abbe Number $\nu$ |
|---|---|---|---|---|
| $L_1$ | $R_1 = +1.000000\ R_1$ | | | |
| | $R_1' = +3.002113\ R_1$ | $d_1 = 0.128948\ R_1$ | 1.67326 | 32.2 |
| | | $s_{1,2} = 0.007603\ R_1$ | | |
| $L_2$ | $R_2 = +0.547420\ R_1$ | $d_2 = 0.050180\ R_1$ | 1.75512 | 27.4 |
| | $R_2' = +0.380153\ R_1$ | | | |
| | | $s_{2,3} = 0\ R_1$ | | |
| $L_3$ | $R_3 = +0.380153\ R_1$ | $d_3 = 0.182474\ R_1$ | 1.69100 | 54.8 |
| | $R_3' = +1.313810\ R_1$ | | | |
| | | $s_{3,4} = 0.033058\ R_1$ | | |
| $L_4$ | $R_4 = +1.545046\ R_1$ | $d_4 = 0.038016\ R_1$ | 1.69842 | 30.1 |
| | $R_4' = +0.346700\ R_1$ | | | |
| | | $s_{4,5} = 0.349741\ R_1$ | | |
| $L_5$ | $R_5 = -0.380153\ R_1$ | $d_5 = 0.060825\ R_1$ | 1.72755 | 28.4 |
| | $R_5' = -0.503322\ R_1$ | | | |
| | | $s_{5,6} = 0.024330\ R_1$ | | |
| $L_6$ | $R_6 = +25.85043\ R_1$ | $d_6 = 0.138376\ R_1$ | 1.71300 | 53.9 |
| | $R_6' = -0.668522\ R_1$ | | | |

The distribution of surface powers of the lens of Example 4 as given in the last table, recomputed for an equivalent focal length of 100 mm. and an equivalent power $\Phi$ of 10 diopters:

Example 4.—Exact power distribution

| | |
|---|---|
| $\phi_1 = +10.155777$ dptr | $\phi_I = + 6.772901$ dptr |
| $\phi_1' = - 3.382876$ dptr | $\phi_{s_{1,2}} = +17.424888$ dptr |
| $\phi_2 = +20.807764$ dptr | $\phi_{III} = +19.485193$ dptr |
| $\phi_2' = - 7.933701$ dptr | |
| $\phi_4 = + 6.816115$ dptr | $\phi_{IV} = -23.571243$ dptr |
| $\phi_4' = -30.387358$ dptr | |
| $\phi_5 = -28.869199$ dptr | $\phi_V = - 7.064656$ dptr |
| $\phi_5' = +21.804543$ dptr | $\phi_{s_{5,6}} = +22.220599$ dptr |
| $\phi_6 = + 0.416056$ dptr | $\phi_{VI} = +16.504146$ dptr |
| $\phi_6' = +16.088090$ dptr | |

This power distribution is in accordance with the characteristic properties of the invention hereinbefore set out.

The lens of Example 4 possesses unusually complete fine correction. For an incident ray height of 18.8508% $f$ the zonal departure from fulfillment of the sine coincidence condition amounts to only $15.12 \times 10^{-5} f$. The longitudinal variation in the sagittal focus is exactly zero for a principal ray inclination angle of 22°, 20', 13.1" on the object side. This means that the sagittal image point for this principal ray inclination lies in the Gaussian image plane at a displacement of 40.3548% $f$ from the optical axis. For a principal ray inclination angle on the object side of 17°, 38', 31.2" the chromatic lateral aberration between the helium $d$ line and the $f$ hydrogen line of 4861 Angstroms amounts to only $1.71 \times 10^{-5} f$. For this yellow line the meridional astigmatic point of focus (i. e. the tangential image point for an infinitely distant object) is located in front of the Gaussian image plane by only $77.62 \times 10^{-5} f$.

In Example 5, now to be considered, both of the exterior converging elements $L_1$ and $L_6$ are made of glass types whose index is less than 1.7 for the yellow $d$ line of the helium spectrum having a wareform of 5876 Angstroms. The high relative aperture of $f/1.9$ is however retained. The approximate distribution of powers in this lens is as follows:

Example 5.—Approximate distribution of powers

| | | |
|---|---|---|
| $\phi_1 = +1.03\ \Phi$ | $\phi_I = +0.69\ \Phi$ | $n_1 = 1.67$ |
| $\phi_1' = -0.34\ \Phi$ | | |
| $\phi_2 = +2.11\ \Phi$ | $\phi_{II} = -0.92\ \Phi$ | $n_2 = 1.76$ |
| $\phi_2' = -3.03\ \Phi$ | | |
| $\phi_3 = +2.78\ \Phi$ | $\phi_{III} = +1.98\ \Phi$ | $n_3 = 1.69$ |
| $\phi_3' = -0.80\ \Phi$ | | |
| $\phi_4 = +0.69\ \Phi$ | $\phi_{IV} = -2.39\ \Phi$ | $n_4 = 1.70$ |
| $\phi_4' = -3.08\ \Phi$ | | |
| | Diaphragm space | |
| $\phi_5 = -2.92\ \Phi$ | | |
| $\phi_5' = +2.21\ \Phi$ | $\phi_V = -0.71\ \Phi$ | $n_5 = 1.73$ |
| $\phi_6 = +0.04\ \Phi$ | | |
| $\phi_6' = +1.61\ \Phi$ | $\phi_{VI} = +1.65\ \Phi$ | $n_6 = 1.69$ |

In this table as before, $\Phi$ is the equivalent refractive power of the complete system. This form of construction makes possible the achievement of an unusually fine correction even though the index values of all positive elements are lower than the index values of all negative elements. Consequently the particular form of the lens of the invention illustrated in this example does not follow the constructional theorem of Rudolph (c. f. von Rohr, Theorie und Geschichte des Photographischen Objektivs, Berlin, 1899, p. 360) which is restrictive upon choice of glasses. On the contrary it makes use of the unusually wide latitude of choice in glasses of the invention. On the basis of a 100 mm. focal length $f_0$ the finely corrected lens of Example 5 possesses the following data:

*Example 5.—Exact lens data*

[Equivalent focal length $f=100$ mm.]

| Element | Radii in mm. | Thickness $d$ or Spacing $s$ in mm. | Index $n$ | Abbe number $v$ |
|---|---|---|---|---|
| $L_1$ | $R_1 = +65.4488$ | | | |
| | | $d_1 = 8.4395$ | 1.67326 | 32.2 |
| | $R_1' = +196.485$ | | | |
| | | $s_{1,2} = 0.4976$ | | |
| $L_2$ | $R_2 = +35.8280$ | | | |
| | | $d_2 = 3.2842$ | 1.75512 | 27.4 |
| | $R_2' = +24.8806$ | | | |
| | | $s_{2,3} = 0$ | | |
| $L_3$ | $R_3 = +24.8806$ | | | |
| | | $d_3 = 11.9427$ | 1.69100 | 54.8 |
| | $R_3' = +85.9873$ | | | |
| | | $s_{3,4} = 2.1636$ | | |
| $L_4$ | $R_4 = +101.160$ | | | |
| | | $d_4 = 2.4881$ | 1.69842 | 30.1 |
| | $R_4' = +22.6911$ | | | |
| | | $s_{4,5} = 22.8901$ | | |
| $L_5$ | $R_5 = -24.8806$ | | | |
| | | $d_5 = 3.9809$ | 1.72755 | 28.4 |
| | $R_5' = -32.9419$ | | | |
| | | $s_{5,6} = 1.5924$ | | |
| $L_6$ | $R_6 = +1691.88$ | | | |
| | | $d_6 = 8.8575$ | 1.69347 | 53.5 |
| | $R_6' = -43.1131$ | | | |

In the diaphragm space the diaphragm plane is located at a distance $b_1$ of 11.9427 mm. behind the rear vertex of $L_4$ and at a distance $b_2$ of 10.9464 mm. in front of the front vertex of $L_5$.

The equivalent power of the finely corrected system whose data are set forth in the preceding table is 10 diopters, corresponding to its focal length of 100 mm. The individual surface powers possess the following values:

*Example 5.—Exact power distributions*

$\phi_1 = +10.286820$ dptr
$\phi_1' = -3.426521$ dptr   $\}\varphi_I = +6.860299$ dptr
$\phi_2 = +21.076253$ dptr
$\phi_2' = -30.349750$ dptr  $\}\varphi_{II} = -9.273497$ dptr
$\phi_3 = +27.772642$ dptr
$\phi_3' = -8.036070$ dptr   $\}\varphi_{III} = +19.736572$ dptr
$\phi_4 = +6.904112$ dptr
$\phi_4' = -30.779469$ dptr  $\}\varphi_{IV} = -23.875357$ dptr Diaphragm space $\phi_5 = -29.241658$ dptr
$\phi_5' = +22.085854$ dptr  $\}\varphi_V = -7.155804$ dptr
$\phi_6 = +0.409881$ dptr
$\phi_6' = +16.084902$ dptr  $\}\varphi_{VI} = +16.494783$ These surface power data demonstrate with what slight changes in the basic power distribution the exact working out of the system of Example 5 was possible. Moreover in spite of the rigorous choice of glasses the lens of Example 5 achieves not only the advanced properties of the lenses of the invention but exceeds them as the following values from exact ray tracing will make clear.

On the axis the variation with color in the longitudinal departure from satisfaction of the sine coincidence condition amounts to only $5.97 \times 10^{-5}f$ between the yellow helium $d$ line and the blue hydrogen $f$ line.

For the zone of maximum spherical abberration, with an incident ray height of $18.6107f$ the zonal departure from fulfillment of the sine coincidence condition amounts to substantially $11.9 \times 10^{-5}f$.

In this example, within the total useful field angle of 45 degrees the astigmatism is exactly zero for a principal ray inclination $\omega_0$ on the object side of 21°, 24′, 45″. The saggital astigmatic image point coincides exactly with the Gaussian image plane for a principal ray inclination on the object side of 22°, 20′, 2″. Hence the longitudinal error in the sagittal focus is exactly zero for this field angle.

The zonal increase in the sagittal longitudinal astigmatism amounts to only $17.91 \times 10^{-5}f$ between principal rays inclined on the object side by 13°, 38′, 38″ and 17°, 38′, 31″. Likewise for this same lateral range of angles, which is particularly critical in normal photographic usage, the zonal increase of the meridional astigmatism amounts to only $10.95 \times 10^{-5}f$. The chromatic errors for axial and extra-axial points can be unusually well corrected in the objective type of the present invention. In the critical lateral portions of the field, the present invention also provides the lens designed with improved possibilities for a high degree of fine correction. This has been included in the lens of Example 5. In this lens the lateral chromatic difference between the yellow $d$ line of helium and the blue $f$ line of hydrogen, measured in the focal plane of the objective, amounts to only 2 millionths of the focal length for a chief ray of heterochromatic light incident on the object side at an inclination of 17°, 38′, 38″.

This unusually complete chromatic fine correction for extra-axial points constitutes a striking new possibility provided by the invention. To emphasize this fact the front element $L_1$ in Example 5 shows, contrary to customary practice, the use of flint glass with high dispersion, whereas customarily such positive components are made of crown glasses with low dispersion. The lens of the invention consequently provides greatly improved performance and at the same time gives to the designer a wide lattitude of choice.

I claim:

1. A high speed lens comprising, from front to back, a positive meniscus element and a triplet including a front negative meniscus element, a front positive element of unequal surface curvatures and a negative element having its more strongly divergent surface directed toward the rear, and, behind the diaphragm position, a rear negative meniscus element and a rear positive element of unequal surface curvatures, the powers of the front surface of the front negative meniscus element and of the rear surface of the rear negative meniscus element both lying between 1.4 and 3.2 times the equivalent power of the entire lens and the absolute value of the sum of the surface power sums of the said negative meniscus elements lying between 1.15 and 2.3 times the said equivalent power.

2. A high speed lens according to claim 1 in which the surface power sum of the positive meniscus element lies between 0.4 and 0.9 times the equivalent power of the entire lens.

3. A high speed lens according to claim 1 in which the absolute value of the surface power sum of the front negative meniscus element lies between 0.65 and 1.3 times the equivalent power of the entire lens and in which the absolute value of the surface power sum of the rear negative meniscus element lies between 0.5 and 1.0 times the said equivalent power.

4. A high speed lens according to claim 1 in which the absolute value of the sum of the surface power sums of the rear negative meniscus element and rear positive element lies between 0.65 and 1.3 times the equivalent power of the entire lens.

5. A high speed lens according to claim 4 in which the surface power sum of the rear positive element lies between 1.15 and 2.3 times the absolute value of the sum of the surface power sums of the front and rear negative meniscus elements.

6. A high speed lens according to claim 1 in which the surface power sums $\phi_I$, $\phi_{II}$, $\phi_V$ and $\phi_{VI}$ of the positive meniscus element, front negative meniscus element, rear negative meniscus element and rear positive element respectively are related to the equivalent power $\Phi$ of the entire lens by the following inequalities:

$$0.40\ \Phi < \phi_I < 0.90\ \Phi$$
$$0.65\ \Phi < -\phi_{II} < 1.30\ \Phi$$
$$0.50\ \Phi < -\phi_V < 1.00\ \Phi$$
$$1.15\ \Phi < \phi_{VI} < 2.30\ \Phi$$

7. A high speed lens according to claim 1 in which the surface power sum of the front positive element of unequal surface curvatures lies between 1.3 and 2.6 times the equivalent power of the entire lens.

8. A high speed lens according to claim 1 in which the absolute value of the surface power sum of the negative element immediately preceding the diaphragm position lies between 1.6 and 3.2 times the equivalent power of the entire lens.

9. A high speed lens according to claim 1 in which the surface power sums $\phi$, with subscripts I to VI from front to rear, are related to the equivalent power $\Phi$ of the entire lens according to the following inequalities:

$$0.40\ \Phi < \phi_I < 0.90\ \Phi$$
$$0.65\ \Phi < -\phi_{II} < 1.30\ \Phi$$
$$1.30\ \Phi < \phi_{III} < 2.60\ \Phi$$
$$1.60\ \Phi < -\phi_{IV} < 3.20\ \Phi$$
$$0.50\ \Phi < -\phi_V < 1.00\ \Phi$$
$$1.15\ \Phi < \phi_{VI} < 2.30\ \Phi$$

10. A high speed lens comprising, from front to back, a positive meniscus element and a triplet including a front negative meniscus element, a front positive element of unequal surface curvatures and a negative element having its more strongly divergent surface to the rear, and, behind the diaphragm position, a rear negative meniscus element and a rear positive element of unequal surface curvatures, the powers $\phi$ of the front surfaces and $\phi'$ of the rear surfaces and the thicknesses $d$ and spacings $s$ of said elements, with successive subscripts from front to rear, being related to the total power $\Phi$ of the lens and to its equivalent focal length $\Phi^{-1}$ substantially according to the following relation:

| | |
|---|---|
| $\phi_1 = +1.1\ \Phi$ | $d_1 = 0.07\ \Phi^{-1}$ |
| $\phi_1' = -0.45\ \Phi$ | $s_{1,2} \approx 0.01\ \Phi^{-1}$ |
| $\phi_2 = +2.0\ \Phi$ | $d_2 = 0.03\ \Phi^{-1}$ |
| $\phi_2' = -3.0\ \Phi$ | $s_{2,3} \approx 0\ \Phi^{-1}$ |
| $\phi_3 = +2.9\ \Phi$ | $d_3 = 0.12\ \Phi^{-1}$ |
| $\phi_3' = -0.8\ \Phi$ | $s_{3,4} \approx 0.02\ \Phi^{-1}$ |
| $\phi_4 = +0.7\ \Phi$ | $d_4 = 0.03\ \Phi^{-1}$ |
| $\phi_4' = -3.2\ \Phi$ | $s_{4,5} = 0.23\ \Phi^{-1}$ |
| $s_5 = -3.0\ \Phi$ | $d_5 = 0.04\ \Phi^{-1}$ |
| $\phi_5' = +2.2\ \Phi$ | $s_{5,6} \approx 0.01\ \Phi^{-1}$ |
| $\phi_6 = 0$ | $d_6 = 0.09\ \Phi^{-1}$ |
| $\phi_6' = +1.7\ \Phi$ | |

11. A high speed lens comprising, from front to back, a positive meniscus element $L_1$ and a triplet including a front negative meniscus element $L_2$, a front positive element of unequal surface curvatures $L_3$ and a negative element $L_4$ having its more strongly divergent surface to the rear, and, behind the diaphragm position, a rear negative meniscus element $L_5$ and a rear positive element of unequal surface curvatures $L_6$, the said elements conforming substantially to the following conditions, wherein $R_1$ to $R_6'$ are the several radii of curvature of the refracting surfaces of the elements, $d_1$ to $d_6$ are the axial thicknesses of the elements, $s_{1,2}$ to $s_{5,6}$ are the axial spacings between the elements, and $f$ is the effective focal length of the lens:

| Element | Radii | Thickness $d$ or Spacing $s$ | Index |
|---|---|---|---|
| $L_1$ | $R_1 = +0.62f$ | $d_1 = 0.065f$ | 1.70 |
|  | $R_1' = +1.5f$ | $s_{1,2} = 0.005f$ |  |
| $L_2$ | $R_2 = +0.36f$ | $d_2 = 0.03f$ | 1.73 |
|  | $R_2' = +0.24f$ | $s_{2,3} = 0$ |  |
| $L_3$ | $R_3 = +0.24f$ | $d_3 = 0.12f$ | 1.69 |
|  | $R_3' = +0.86f$ | $s_{3,4} = 0.02f$ |  |
| $L_4$ | $R_4 = +1.0f$ | $d_4 = 0.025f$ | 1.70 |
|  | $R_4' = +0.22f$ | $s_{4,5} = 0.228f$ |  |
| $L_5$ | $R_5 = -0.24f$ | $d_5 = 0.04f$ | 1.73 |
|  | $R_5' = -0.32f$ | $s_{5,6} = 0.001f$ |  |
| $L_6$ | $R_6 = \infty$ | $d_6 = 0.09f$ | 1.69 |
|  | $R_6' = -0.4f$ |  |  |

12. A high speed lens comprising, from front to back, a positive meniscus element $L_1$ and a triplet including a front negative meniscus element $L_2$, a front positive element of unequal surface curvatures $L_3$ and a negative element $L_4$ having its more strongly divergent surface to the rear, and, behind the diaphragm position, a rear negative meniscus element $L_5$ and a rear positive element of unequal surface curvatures $L_6$, the said elements conforming substantially to the following conditions, wherein $R_1$ to $R_6'$ are the several radii of curvature of the refracting surfaces of the elements, $d_1$ to $d_6$ are the axial thicknesses of the elements, $s_{1,2}$ to $s_{5,6}$ are the axial spacings between the elements, the effective focal length $f$ of the lens being equal to 1.414 $R_1$:

| Element | Radii as multiples of $R_1$ | Thickness $d$ or Spacing $s$ as Multiples of $R_1$ | Index |
|---|---|---|---|
| $L_1$ | $R_1 = +1.0\ R_1$ | $d_1 = 0.093\ R_1$ | 1.703 |
|  | $R_1' = +3.0\ R_1$ | $s_{1,2} = 0.007\ R_1$ |  |
| $L_2$ | $R_2 = +0.51\ R_1$ | $d_2 = 0.057\ R_1$ | 1.728 |
|  | $R_2' = +0.36\ R_1$ | $s_{2,3} = 0.0\ R_1$ |  |
| $L_3$ | $R_3 = +0.36\ R_1$ | $d_3 = 0.171\ R_1$ | 1.659 |
|  | $R_3' = +1.23\ R_1$ | $s_{3,4} = 0.031\ R_1$ |  |
| $L_4$ | $R_4 = +1.45\ R_1$ | $d_4 = 0.036\ R_1$ | 1.673 |
|  | $R_4' = +0.32\ R_1$ | $s_{4,5} = 0.328\ R_1$ |  |
| $L_5$ | $R_5 = -0.36\ R_1$ | $d_5 = 0.057\ R_1$ | 1.728 |
|  | $R_5' = -0.47\ R_1$ | $s_{5,6} = 0.002\ R_1$ |  |
| $L_6$ | $R_6 = +21.4\ R_1$ | $d_6 = 0.174\ R_1$ | 1.693 |
|  | $R_6' = -0.62\ R_1$ |  |  |

13. A high speed lens comprising, from front to back, a positive meniscus element $L_1$ and a triplet including a front negative meniscus element $L_2$, a front positive element of unequal surface curvatures $L_3$ and a negative element $L_4$ having its more strongly divergent surface to the rear, and, behind the diaphragm position, a rear negative meniscus element $L_5$ and a rear positive element of unequal surface curvatures $L_6$, the said elements conforming substantially to the following conditions, wherein $R_1$ to $R_6'$ are the several radii of curvature of the refracting surfaces of the elements, $d_1$ to $d_6$ are the axial thicknesses of the elements, $s_{1,2}$ to $s_{5,6}$ are the axial spacings between the elements, and $f$ is the effective focal length of the lens:

| Element | Radii as multiples of equivalent focal length $f$ | Thickness $d$ or Spacing $s$ as Multiples of $f$ | Index |
|---|---|---|---|
| $L_1$ | $R_1=+0.67f$ | $d_1=0.085f$ | 1.724 |
|  | $R_1'=+1.81f$ | $s_{1,2}=0.005f$ |  |
| $L_2$ | $R_2=+0.36f$ | $d_2=0.033f$ | 1.728 |
|  | $R_2'=+0.25f$ | $s_{2,3}=0.0f$ |  |
| $L_3$ | $R_3=+0.25f$ | $d_3=0.121f$ | 1.660 |
|  | $R_3'=+0.87f$ | $s_{3,4}=0.022f$ |  |
| $L_4$ | $R_4=+1.02f$ | $d_4=0.025f$ | 1.673 |
|  | $R_4'=+0.23f$ | $s_{4,5}=0.231f$ |  |
| $L_5$ | $R_5=-0.25f$ | $d_5=0.040f$ | 1.728 |
|  | $R_5'=+0.33f$ | $s_{5,6}=0.016f$ |  |
| $L_6$ | $R_6=+25.2f$ | $d_6=0.092f$ | 1.713 |
|  | $R_6'=-0.44f$ |  |  |

14. A high speed lens comprising, from front to back, a positive meniscus element $L_1$ and a triplet including a front negative meniscus element $L_2$, a front positive element of unequal surface curvatures $L_3$ and a negative element $L_4$ having its more strongly divergent surface to the rear, and, behind the diaphragm position, a rear negative miniscus element $L_5$ and a rear positive element of unequal surface curvatures $L_6$, the said elements conforming substantially to the following conditions, wherein $R_1$ to $R_6'$ are the several radii of curvature of the refracting surfaces of the elements, $d_1$ to $d_6$ are the axial thicknesses of the elements, $s_{1,2}$ to $s_{5,6}$ are the axial spacings between the elements, the effective focal length $f$ of the lens being equal to 1.414 $R_1$:

| Element | Radii as Multiples of $R_1$ | Thickness $d$ or Spacing $s$ as Multiples of $R_1$ | Index |
|---|---|---|---|
| $L_1$ | $R_1=+1.00R_1$ | $d_1=.13R_1$ | 1.67 |
|  | $R_1'=+3.00R_1$ | $s_{1,2}=.01R_1$ |  |
| $L_2$ | $R_2=+.55R_1$ | $d_2=.05R_1$ | 1.76 |
|  | $R_2'=+.38R_1$ | $s_{2,3}=0R_1$ |  |
| $L_3$ | $R_3=+.38R_1$ | $d_3=.18R_1$ | 1.69 |
|  | $R_3'=+1.31R_1$ | $s_{3,4}=.03R_1$ |  |
| $L_4$ | $R_4=+1.55R_1$ | $d_4=.04R_1$ | 1.70 |
|  | $R_4'=+.35R_1$ | $s_{4,5}=.35R_1$ |  |
| $L_5$ | $R_5=-.38R_1$ | $d_5=.06R_1$ | 1.73 |
|  | $R_5'=-.50R_1$ | $s_{5,6}=.02R_1$ |  |
| $L_6$ | $R_6=+2.60R_1$ | $d_6=.14R_1$ | 1.71 |
|  | $R_6'=-.67R_1$ |  |  |

15. A high speed lens comprising, from front to back, a positive meniscus element and a triplet including a front negative meniscus element, a front positive element of unequal surface curvatures and a negative element having its more strongly divergent surface to the rear, and, behind the diaphragm position, a rear negative meniscus element and a rear positive element of unequal surface curvatures, indices of refraction $n$, the powers $\phi$ of the front surfaces and the powers $\phi'$ of the rear surfaces of said elements, with successive subscripts from front to rear being related to the total power $\Phi$ of the lens substantially according to the following relationships:

| | |
|---|---|
| $\phi_1=+1.03\Phi$ | $n_1=1.67$ |
| $\phi_1'=-0.34\Phi$ | |
| $\phi_2=+2.11\Phi$ | $n_2=1.76$ |
| $\phi_2'=-3.03\Phi$ | |
| $\phi_3=+2.78\Phi$ | $n_3=1.69$ |
| $\phi_3'=-0.80\Phi$ | |
| $\phi_4=+0.69\Phi$ | $n_4=1.70$ |
| $\phi_4'=-3.08\Phi$ | |
| $\phi_5=-2.92\Phi$ | $n_5=1.73$ |
| $\phi_5'=+2.21\Phi$ | |
| $\phi_6=+0.04\Phi$ | $n_6=1.69$ |
| $\phi_6'=+1.61\Phi$ | |

16. A high speed lens comprising, from front to back, a positive meniscus element $L_1$ and a triplet including a front negative meniscus element $L_2$, a front positive element of unequal surface curvatures $L_3$ and a negative element $L_4$ having its more strongly divergent surface to the rear, and, behind the diaphragm position, a rear negative meniscus element $L_5$ and a rear positive element of unequal surface curvatures $L_6$, the said elements conforming substantially to the following conditions, wherein $R_1$ to $R_6'$ are the several radii of curvature of the refracting surfaces of the elements, $d_1$ to $d_6$ are the axial thicknesses of the elements, $s_{1,2}$ to $s_{5,6}$ are the axial spacings between the elements, and $f$ is the effective focal length of the lens:

| Element | Radii in mm. | Thickness $d$ or Spacing $s$ in mm. | Index | Abbe No. |
|---|---|---|---|---|
| $L_1$ | $R_1=+65.4488$ | $d_1=8.4395$ | 1.67326 | 32.2 |
|  | $R_1'=+196.485$ | $s_{1,2}=0.4976$ |  |  |
| $L_2$ | $R_2=+35.8280$ | $d_2=3.2842$ | 1.75512 | 27.4 |
|  | $R_2'=+24.8806$ | $s_{2,3}=0$ |  |  |
| $L_3$ | $R_3=+24.8806$ | $d_3=11.9427$ | 1.69100 | 54.8 |
|  | $R_3'=+85.9873$ | $s_{3,4}=2.1636$ |  |  |
| $L_4$ | $R_4=+101.160$ | $d_4=2.4881$ | 1.69842 | 30.1 |
|  | $R_4'=+22.6911$ | $s_{4,5}=22.8901$ |  |  |
| $L_5$ | $R_5=-24.8806$ | $d_5=3.9809$ | 1.72755 | 28.4 |
|  | $R_5'=-32.9419$ | $s_{5,6}=1.5924$ |  |  |
| $L_6$ | $R_6=+1691.88$ | $d_6=8.8575$ | 1.69347 | 53.5 |
|  | $R_6'=-43.1131$ |  |  |  |

References Cited in the file of this patent

UNITED STATES PATENTS

| | | |
|---|---|---|
| 2,649,023 | Tronnier | Aug. 18, 1953 |
| 2,662,447 | Tronnier | Dec. 15, 1953 |
| 2,673,491 | Tronnier | Mar. 30, 1954 |
| 2,677,989 | Tronnier | May 11, 1954 |
| 2,720,139 | Tronnier | Oct. 11, 1955 |

UNITED STATES PATENT OFFICE

Certificate of Correction

Patent No. 2,837,009                                                    June 3, 1958

Albrecht Wilhelm Tronnier

It is hereby certified that error appears in the printed specification of the above numbered patent requiring correction and that the said Letters Patent should read as corrected below.

Column 1, lines 59 and 60, column 4, line 14, and column 7, line 40, for "$L_2, L_3, L_4$", each occurrence, read —$L_{2,3,4}$—; column 6, line 3, for "extract" read —exact—; column 7, line 11, the equation should appear as shown below instead of as in the patent—

$$\phi_V = -7.718 \text{ dptr}$$

column 9, line 26, in the table, Example 3, first column, under the heading "Element", second item, for "$L_1$" read —$L_2$— column 11, lines 43 to 58, the table should appear as shown below instead of as in the patent—

*Example 4.—Exact power distribution*

| | |
|---|---|
| $\phi_1 = +10.155777$ dptr | $\phi_I = + 6.772901$ dptr |
| $\phi_1' = - 3.382876$ dptr | $\phi_{s_{1,1}} = +17.424888$ dptr |
| $\phi_2 = +20.807764$ dptr | $\phi_{II} = - 9.155413$ dptr |
| $\phi_2' = -29.963177$ dptr | |
| $\phi_3 = +27.418894$ dptr | |
| $\phi_3' = - 7.933701$ dptr | $\phi_{III} = +19.485193$ dptr |
| $\phi_4 = + 6.816115$ dptr | |
| $\phi_4' = -30.387358$ dptr | $\phi_{IV} = -23.571243$ dptr |
| $\phi_5 = -28.869199$ dptr | |
| $\phi_5' = +21.804543$ dptr | $\phi_V = - 7.064656$ dptr |
| $\phi_6 = + 0.416056$ dptr | $\phi_{s_{5,6}} = +22.220599$ dptr |
| $\phi_6' = +16.088090$ dptr | $\phi_{VI} = +16.504146$ dptr | column 12, line 41, for "wareform" read —wavelength—; column 14, line 15, for "designed" read —designer—; column 15, line 58, in the table, first column thereof, ninth item, for "$s_5$" read —$\phi_5$—.

Signed and sealed this 21st day of October 1958.

[SEAL]

Attest:
KARL H. AXLINE,
*Attesting Officer.*

ROBERT C. WATSON,
*Commissioner of Patents.*